United States Patent
Lee

(10) Patent No.: US 10,408,704 B2
(45) Date of Patent: Sep. 10, 2019

(54) TESTING APPARATUS FOR SCRAMJET ENGINE

(71) Applicant: KOREA AEROSPACE RESEARCH INSTITUTE, Daejeon (KR)

(72) Inventor: Yang Ji Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 15/240,827

(22) Filed: Aug. 18, 2016

(65) Prior Publication Data

US 2017/0138818 A1    May 18, 2017

(30) Foreign Application Priority Data

Nov. 18, 2015  (KR) .................. 10-2015-0161610

(51) Int. Cl.
*G01M 9/04* (2006.01)
*G01M 15/02* (2006.01)
*G01M 15/14* (2006.01)

(52) U.S. Cl.
CPC .............. *G01M 9/04* (2013.01); *G01M 15/02* (2013.01); *G01M 15/14* (2013.01)

(58) Field of Classification Search
CPC ....................................................... G01M 9/04
See application file for complete search history.

(56) References Cited

U.S. PATENT DOCUMENTS

| | | | | |
|---|---|---|---|---|
| 4,170,110 A * | 10/1979 | Radin | .................. | F02K 7/10 60/204 |
| 2006/0124360 A1* | 6/2006 | Lee | .................. | E21B 43/305 175/61 |
| 2008/0128547 A1* | 6/2008 | Pederson | .................. | B64C 30/00 244/55 |
| 2010/0032169 A1* | 2/2010 | Adam | .................. | E21B 43/103 166/382 |
| 2015/0000287 A1* | 1/2015 | Woerz | .................. | F01D 9/023 60/752 |
| 2015/0308922 A1* | 10/2015 | Cox | .................. | G01M 9/04 73/147 |
| 2015/0330550 A1* | 11/2015 | Hairston | .................. | F16L 55/1651 138/98 |

FOREIGN PATENT DOCUMENTS

| | | |
|---|---|---|
| JP | H07-34865 A | 2/1995 |
| JP | 2005-256736 A | 9/2005 |

OTHER PUBLICATIONS

Yang Ji Lee et al, "Development of the Scramjet engine Test Facility (SeTF) in Korea Aerospace Research Institute", Journal of KSPE (Korea Society of Propulsion Engineers), vol. 14, No. 3, Jun. 2010, pp. 69-78.

* cited by examiner

*Primary Examiner* — Clayton E. LaBalle
*Assistant Examiner* — Dennis Hancock
(74) *Attorney, Agent, or Firm* — Rabin & Berdo, P.C.

(57) ABSTRACT

A testing apparatus for Scramjet engine is capable of preventing breakage of liners in a high-pressure and high-temperature environment in which pressure is 10 Mpa or above and temperature is 1800 K or above. To this end, the testing apparatus for Scramjet engine includes a pipe that endures high-pressure environment, a first liner in a tubular shape, being provided within the pipe, and a second liner in a tubular shape, being provided within the pipe, in which an outer circumference of the second liner is overlapped with an inner circumference of a rear end of the first liner.

5 Claims, 4 Drawing Sheets

TESTING APPARATUS FOR SCRAMJET ENGINE

CROSS-REFERENCE TO RELATED APPLICATIONS

This application claims priority from Korean Patent Application No. 10-2015-0161610, filed on Nov. 18, 2015 in the Korean Intellectual Property Office, the disclosure of which is incorporated herein by reference in its entirety.

BACKGROUND

1. Field of the Invention

The present disclosure relates to a testing apparatus for Scramjet engine which is configured to test a Scramjet engine.

2. Description of the Related Art

Generally, a scramjet engine is a shortened expression for the Supersonic Combustion Ramjet engine that is a variant form of Ramjet engine.

Like the Ramjet engine, the Scramjet engine includes an airflow intake, a combustion chamber, and a nozzle, but there is a difference. That is, while the airflow in the Ramjet engine is generated in the inlet into oblique shock wave and normal shock wave and then decelerated into subsonic speed before being introduced into the combustion chamber, the airflow in the Scramjet engine is generated in the inlet into oblique shock wave only, and, although decelerated, the airflow is introduced into the combustion chamber while maintaining supersonic speed.

Since the airflow is introduced into the combustion chamber at supersonic speed in the Scramjet engine, testing apparatus that can endure high pressure of 10 Mpa or above and high temperature of 1800 K or above is necessary in order to test the Scramjet engine at ground level.

The conventional Scramjet engine testing apparatus 10 includes, as illustrated in FIG. 1, a pipe 11 that can endure high pressure of 10 MPa or above, a tubular liner 12 that is provided within the pipe 11 and that can endure high temperature of 1800 K or above, and a spacer 13 that maintains the pipe 11 and the liner 12 at a distance.

However, the conventional Scramjet engine testing apparatus has shortcomings. That is, when the test time continues for 30 seconds or longer in the blow-down type high enthalpy wind tunnel, the difference between the internal pressure of the liner and the pressure between the liner and the pipe can lead into breakage of the liner, and the thermal expansion of the liner can also lead into breakage of the liner.

SUMMARY

An object of the present disclosure is to solve the problems mentioned above, and accordingly, it is an object of the present disclosure to provide a testing apparatus for Scramjet engine, capable of preventing breakage of a liner under high-pressure and high-temperature environment.

In order to achieve these and other objects, a testing apparatus for Scramjet engine according to one exemplary embodiment is provided, which may include a pipe, a first liner in a tubular shape, being provided within the pipe, and a second liner in a tubular shape, being provided within the pipe, wherein an outer circumference of the second liner is overlapped with an inner circumference of a rear end of the first liner.

According to an exemplary embodiment, the testing apparatus may additionally include a first spacer which maintains a distance between the first liner and the pipe, and a second spacer which maintains a distance between the second liner and the pipe.

With reference to a radial direction of a circular cross section of the pipe, the first spacer may have a less thickness than the second spacer.

The rear end of the first liner and the front end of the second liner may be maintained being overlapped in all operational states of the testing apparatus for Scramjet engine that includes before operation, during operation, and after operation.

The pipe may be composed of carbon steel or stainless steel, and each of the first and second liners may be composed of any one of nickel-chromium-based alloys (INCONEL), nickel-based steel alloys (HASTELLOY), and tantalum-zirconium-molybdenum (TZM) alloy.

When the pipe has a straight pipe shape, each of the first and second liners may be disposed in a row along the straight pipe shape.

Meanwhile, in another exemplary embodiment, a testing apparatus for Scramjet engine is provided, which may include a pipe in a curved pipe shape, a first liner in a straight pipe shape, being provided in the pipe, and a second liner in a straight pipe shape, being provided within the pipe. Each of the first and second liners in the straight pipe shape may be cut into a plurality of segments, and each of the plurality of segments cut from the first and second liners may be disposed along a curved pipe shape.

A first segment of the first liner and a first segment of the second liner may be disposed in a row, and an inner circumference of a rear end of the first segment of the first liner may be overlapped with an outer circumference of a front end of the first segment. A second segment of the first liner may be inclined to suit the curved pipe shape, and bound to the front end of the first segment of the first liner, and a second segment of the second liner may be inclined to suit the curved pipe shape, and bound to the rear end of the first segment of the second liner.

Meanwhile, according to yet another exemplary embodiment, a testing apparatus for Scramjet engine is provided, which may include a first pipe in a straight pipe shape, a first liner in a straight pipe shape, being provided within the first pipe, a second liner in a straight pipe shape, being provided within the second pipe, wherein an outer circumference of a front end of the second liner is overlapped with an inner circumference of a rear end of the first liner, a second pipe in a curved pipe shape, being connected to the first pipe, a third pipe in a straight pipe shape, being provided within the second pipe, and a fourth liner in a straight pipe shape, being provided within the second pipe, wherein the fourth liner is inclined to suit the curved pipe shape so as not to collide against an inner circumference of the second pipe, and then bound to the third liner.

According to various exemplary embodiments described above, the testing apparatus for Scramjet engine provide the following effects.

According to various exemplary embodiments, a technical configuration is provided, which includes a pipe, a first liner, and a second liner, and in which an outer circumference of a front end of the second liner is overlapped with an inner circumference of a rear end of the first liner. Accordingly, even when the test time lasts 30 seconds or longer in the blow-down type hypersonic high enthalpy wind tunnel, the pressure can move through a gap between the overlapped first and second liners, and thus the pressure difference between and "B" decreases (herein, "A" means the internal pressure of the first and second liners and "B" means the pressure between the first and second liners and the pipe). As a result, breakage of the first and second liners due to such pressure difference can be prevented.

Further, even when the first and second liners are subject to thermal expansion, breakage of the first and second liners from such thermal expansion can be prevented, because the outer circumference of the second liner can be slidably moved into the inner circumference of the first liner.

BRIEF DESCRIPTION OF THE DRAWINGS

The above and or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
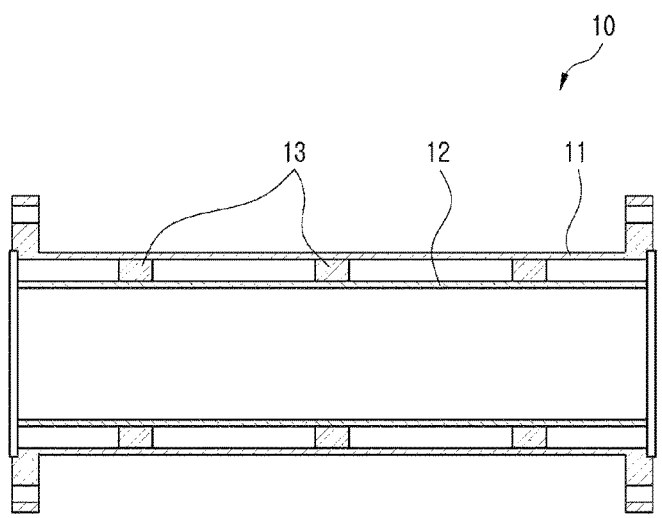
FIG. 1 is a schematic cross sectional view of a conventional testing apparatus for Scramjet engine.

Certain exemplary embodiments of the present inventive concept will be described in greater detail with reference to the accompanying drawings to enable those skilled in the art to work the present disclosure. However, it is not intended to limit the technology described herein to any specific embodiments, as it should be construed as encompassing various modifications, equivalents and or alternatives of the embodiments. In the following description, issues irrelevant with the description are not described as these may obscure the description, and same drawing reference numerals are used for the same elements even in different drawings.

Certain exemplary embodiments of the present inventive concept will now be described in greater detail with reference to the accompanying drawings to enable those skilled in the art to work the present disclosure.

Figure 2:
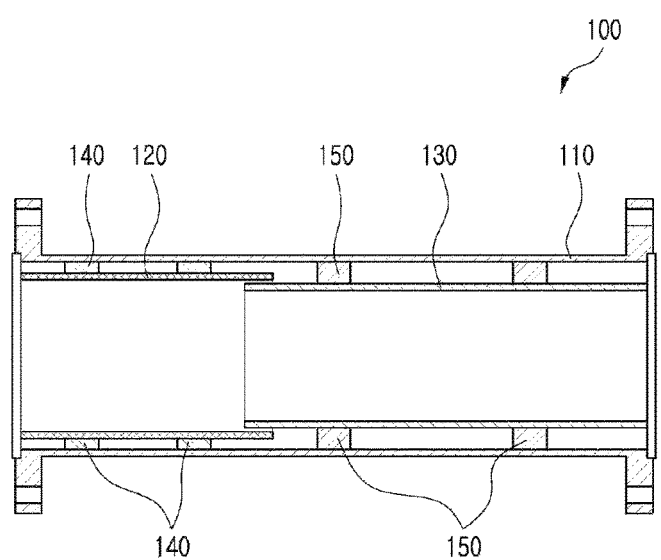
FIG. 2 is a schematic cross sectional view of a testing apparatus for Scramjet engine according to an exemplary embodiment.

FIG. 2 is a schematic cross sectional view of a testing apparatus for Scramjet engine according to an exemplary embodiment.

As illustrated in FIG. 2, the testing apparatus 100 for Scramjet engine according to an exemplary embodiment includes a pipe 110, a first liner 120, and a second liner 130. Hereinbelow, the respective elements will be described in detail with reference to FIG. 2.

As illustrated in FIG. 2, the pipe 110 forms an exterior of the testing apparatus 100 for Scramjet engine, and it is provided to endure high-pressure internal environment that is 10 MPa or above. For example, in order to endure high pressure of 10 Mpa or above, the pipe 110 may be composed of carbon steel or stainless steel that is suitable for the pressure standard, and may be designed to have a thickness that is suitable for the pressure standard.

As illustrated in FIG. 2, the first liner 120 is provided within the pipe 110, has a tubular shape, and is configured to endure high-temperature environment that is 1800 K or above. For example, in order to endure high temperature of 1800 K or above, the first liner 120 may be composed of any one of nickel-chromium-based alloys (INCONEL), nickel-based steel alloys (HASTELLOY), tantalum-zirconium-molybdenum (TZM) alloy.

As illustrated in FIG. 2, the second liner 130 is provided within the pipe 110, has a tubular shape, positioned such that an outer circumference of a front end thereof is overlapped with an inner circumference of a rear end of the first liner 120, and is configured to endure high-temperature environment that is 1800 K or above. For example, in order to endure high temperature of 1800 K or above, the first liner 120 may be composed of any one of nickel-chromium-based alloys (INCONEL), nickel-based steel alloys (HASTELLOY), and TZM alloy.

As illustrated in FIG. 2, the first liner 120 is provided within the pipe 110, has a tubular shape, and is configured to endure high-temperature environment that is 1800 K or above. For example, in order to endure high temperature of 1800 K or above, the first liner 120 may be composed of any one of Inconel, Hastelloy, tantalum-zirconium-molybdenum (TZM) alloy.

As illustrated in FIG. 2, the second liner 130 is provided within the pipe 110, has a tubular shape, positioned such that an outer circumference of a front end thereof is overlapped with an inner circumference of a rear end of the first liner 120, and is configured to endure high-temperature environment that is 1800 K or above. For example, in order to endure high temperature of 1800 K or above, the first liner 120 may be composed of any one of Inconel, Hastelloy, and TZM alloy.

Accordingly, with the outer circumference of the front end of the second liner 130 being overlapped with the inner circumference of the rear end of the first liner 120, even when the test time lasts 30 seconds or longer in the blowdown type supersonic high enthalpy wind tunnel, the pressure can move through a gap between the overlapped first and second liners 120, 130, and thus the pressure difference between "A" and "B" decreases (herein "A" means the internal pressure of the first and second liners 120, 130 and "B" means the pressure between the first and second liners 120, 130 and the pipe 110). As a result, breakage of the first and second liners 120, 130 due to such pressure difference can be prevented. Further, even when the first and second liners 120, 130 are subject to thermal expansion, breakage of the first and second liners 120, 130 from such thermal expansion can be prevented, because the outer circumference of the second liner 130 can be slidably moved along the inner circumference of the first liner 120.

Specifically, the rear end of the first liner 120 and the leading end of the second liner 130 can be maintained being overlapped with each other in all operational states of the testing apparatus 100 for Scramjet engine that includes before operation, during operation, and after operation. Accordingly, irrespective of temperature, the rear end of the first liner 120 and the leading end of the second liner 130 can be stably maintained in a slidably movable relationship with each other, without having a chance of escaping from each other.

Furthermore, as illustrated in FIG. 2, when the pipe 110 has a straight pipe shape, the first and second liners 120, 130 may each be disposed in one row along the straight pipe shape.

Additionally, the testing apparatus 100 for Scramjet engine according to an exemplary embodiment may additionally include first and second spacers 140, 150, as illustrated in FIG. 2.

The first spacer 140 maintains a distance between the first liner 120 and the pipe 110, and the second spacer 150 maintains a distance between the second liner 130 and the pipe 110. Furthermore, considering that the first liner 120 has a greater outer diameter than the second liner 130 in the pipe 110 of the same diameter, with reference to a radial direction of the circular cross section of the pipe 110, the first spacer 140 may have a less thickness than the second spacer 150.

Hereinbelow, the testing apparatus 200 for Scramjet engine according to another exemplary embodiment will be described in detail with reference to FIG. 3.

Figure 3:
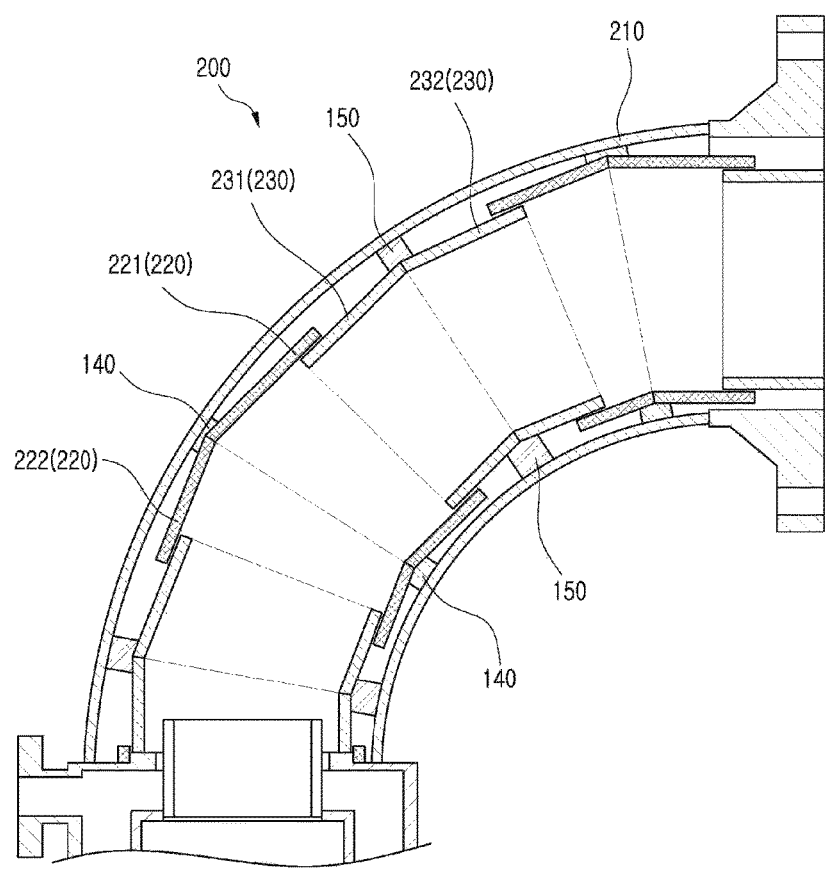
FIG. 3 is a schematic cross sectional view of a testing apparatus for Scramjet engine according to another exemplary embodiment.

FIG. 3 is a schematic cross sectional view of the testing apparatus for Scramjet engine according to another exemplary embodiment.

The testing apparatus 200 for Scramjet engine according to another exemplary embodiment has the similar configuration as the exemplary embodiment already described above, except that, as illustrated in FIG. 3, the pipe 210 has a curved pipe shape, and that the first and second liners 220, 230 in the straight shape are cut into a plurality of segments and disposed in the curved pipe shape. Accordingly, differences between the exemplary embodiments will be mainly described below for the sake of brevity.

The pipe 210 is prepared in the curved pipe shape, and the first and second liners 220, 230 are prepared in the straight pipe shape, respectively.

Each of the first and second liners 220, 230 in the straight pipe shape is cut into a plurality of segments, and as illustrated in FIG. 3, each of the plurality of segments cut from the first and second liners 220, 230 are disposed along the curved pipe shape.

Specifically, the first segment 221 of the first liner 220 and the first segment 231 of the second liner 230 are disposed in a row, and the inner circumference of the rear end of the first segment 221 of the first liner 220 is positioned to be overlapped with the outer circumference of the front end of the first segment 231 of the second liner 230. The second segment 222 of the first liner 220 may be inclined to suit the curved pipe shape and then bound to the front end of the first segment 221 of the first liner 220 by welding, or the like, and the second segment 232 of the second liner 230 may be inclined to suit the curved pipe shape and bound to the rear end of the first segment 231 of the second liner 230 by welding, or the like. Even when the radius of curvature of the pipe 210 increases, the respective segments can be disposed continuously in the same manner.

According to another exemplary embodiment described above, even when the first and second liners 220, 230 fail to have the curved pipe shape due to issues in the materials, and so on, by employing a structure in which the segments of the first and second liners 220, 230 are overlapped with one another, a gap defined among the overlapped segments of the first and second liners 220, 230 allows pressure to move. Accordingly, the internal pressure of the first and second liners 220, 230 decreases, and the pressure difference between the first and second liners 220, 230 and the pipe 210 decreases such that breakage of the segments of the first and second liners 220, 230 due to pressure difference can be prevented. Furthermore, even when the first and second liners 220, 230 are subject to thermal expansion, the breakage of the segments of the first and second liners 220, 230 from such thermal expansion can be prevented, because the outer circumference of the first segment 231 of the second liner 230 can be slidably moved into the inner circumference of the first segment 221 of the first liner 220. Additionally, with the structure of the segments of the first and second liners 220, 230 being inclined and bound to one another, the first and second liners 220, 230 can substantially correspond to the pipe 210 in the curved pipe shape, while maintaining the respective segments thereof in the straight pipe shape.

Hereinbelow, a testing apparatus 300 for Scramjet engine according to yet another exemplary embodiment will be described with reference to FIG. 4.

Figure 4:
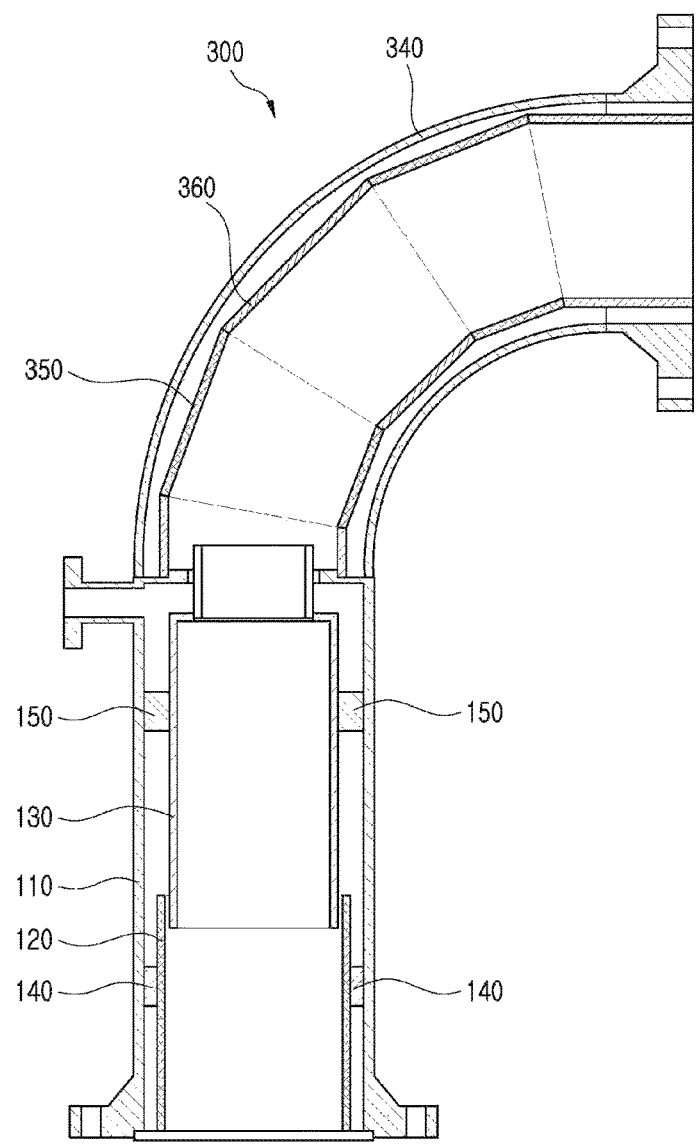
FIG. 4 is a schematic cross sectional view of a testing apparatus for Scramjet engine according to yet another exemplary embodiment.

FIG. 4 is a schematic cross sectional view of a testing apparatus for Scramjet engine according to yet another exemplary embodiment.

As illustrated in FIG. 4, the testing apparatus 300 for Scramjet engine according to yet another exemplary embodiment has a similar configuration of the exemplary embodiments already described above, except for the addition of a second pipe 340 in a curved pipe shape, and third and fourth liners 350, 360. Accordingly, differences from the exemplary embodiments already described above will be mainly described below for the sake of brevity.

As illustrated in FIG. 4, the second pipe 340 has a curved pipe shape, connected to a first pipe (corresponding to the "pipe" mentioned in the exemplary embodiment described above, which will be referred to by the same reference numeral "110"), and, in cooperation with the first pipe 110, forms an exterior of the testing apparatus 300 for Scramjet engine. The second pipe 340 is configured in order to endure the high-pressure internal environment that is 10 Mpa or above. For example, in order to endure high pressure of 10 Mpa or above, the second pipe 340 may be composed of carbon steel or stainless steel that is suitable for the pressure standard, and may be designed to have a thickness that is suitable for the pressure standard.

As illustrated in FIG. 4, the third liner 350 has a straight pipe shape, provided within the second pipe 340 in the curved pipe shape, and is configured to endure high-temperature environment that is 1800 K or above. For example, in order to endure high temperature of 1800 K or above, the third liner 350 may be composed of any one of nickel-chromium-based alloys (INCONEL), nickel-based steel alloys (HASTELLOY), TZM alloy.

As illustrated in FIG. 4, the fourth liner 360 has a straight pipe shape, provided within the second pipe 340 in the curved pipe shape, and inclined to suit the curved pipe shape so as not to collide against the inner circumference of the second pipe 340 and bound to the third liner 350 by welding, or the like. Even when the second pipe 340 has a greater radius of curvature, a plurality of different liners can be bound continuously in this manner. Furthermore, in order to endure high temperature of 1800 K or above, the fourth liner 360 may be composed of any one of nickel-chromium-based alloys (INCONEL), nickel-based steel alloys (HASTELLOY), TZM alloy.

That is, according to yet another exemplary embodiment described above, even when the third and fourth liners 350, 360 cannot be formed into curved pipe shape due to issues in the materials, and so on, the third and fourth liners 350, 360 may be kept in the straight pipe shape, while these 350, 360 can still substantially correspond to the second pipe 340 in the curved pipe shape by way of inclining and bonding.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A testing apparatus for Scramjet engine, comprising:
a pipe;
a first liner in a tubular shape, being provided within the pipe spaced apart from the pipe; and
a second liner in a tubular shape, being provided within the pipe spaced apart from the pipe, wherein an outer circumference of the second liner is overlapped with an inner circumference of a rear end of the first liner,
wherein the first liner is partially overlapped with the second liner, and
wherein the pipe is longer than the first liner, and the pipe is longer than the second liner.

2. The testing apparatus of claim 1, further comprising:
a first spacer which maintains a distance between the first liner and the pipe; and
a second spacer which maintains a distance between the second liner and the pipe.

3. The testing apparatus of claim 2, wherein, with reference to a radial direction of a circular cross section of the pipe, the first spacer has a less thickness than the second spacer.

4. The testing apparatus of claim 2, wherein the rear end of the first liner and the front end of the second liner are maintained being overlapped in all operational states of the testing apparatus for Scramjet engine that includes before operation, during operation, and after operation.

5. The testing apparatus of claim 1, wherein, when the pipe has a straight pipe shape, each of the first and second liners is disposed in a row along the straight pipe shape.

* * * * *